United States Patent [19]
Delaney et al.

[11] Patent Number: 4,892,723
[45] Date of Patent: Jan. 9, 1990

[54] METHOD FOR IMPROVING THE LONG-TERM STABILITY OF $H_2S$ ABSORPTION-OXIDATION PROCESS SOLUTIONS

[75] Inventors: Dennis D. Delaney, Yorba Linda; Hugh W. Gowdy, Irvine, both of Calif.

[73] Assignee: Union Oil Company of California, Brea, Calif.

[21] Appl. No.: 243,460

[22] Filed: Sep. 12, 1988

[51] Int. Cl.$^4$ ............................................. C01B 17/02
[52] U.S. Cl. .............................. 423/573.1; 423/245.1; 423/574 R; 423/576.4; 423/576.6; 423/576.7
[58] Field of Search ................ 423/573.1, 574 R, 220, 423/245.1, 576.4, 576.6, 576.7

[56] References Cited

U.S. PATENT DOCUMENTS

| | | | |
|---|---|---|---|
| 3,736,726 | 6/1973 | Grimm et al. | 423/245.1 |
| 3,810,833 | 5/1974 | Nicklin | 210/23 |
| 4,385,044 | 5/1983 | Wolcott | 423/573 R |
| 4,427,630 | 1/1984 | Aibe et al. | 423/245.1 |
| 4,595,575 | 6/1986 | Oeste et al, | 423/245.1 |

Primary Examiner—Gregory A. Heller
Attorney, Agent, or Firm—Gregory F. Wirzbicki; Arthur E. Oaks

[57] ABSTRACT

The long term stability of process solutions used in $H_2S$-to-sulfur absorption/oxidation process, wherein the incoming hydrogen sulfide-containing gas stream is contaminated with hydrocarbons and/or organic oxygenated compounds and the process is generating an excessive amount of thiosulfate in the process solution, is improved by a method comprising contacting the gas stream and/or the process solution with charcoal to remove both the contamination and at least a portion of the thiosulfate therefrom.

67 Claims, 1 Drawing Sheet

METHOD FOR IMPROVING THE LONG-TERM STABILITY OF H₂S ABSORPTION-OXIDATION PROCESS SOLUTIONS

BACKGROUND OF THE INVENTION

1. Field of the Invention

The present invention relates to the removal of hydrogen sulfide from gas streams with an aqueous washing solution and, more particularly, to a method for stabilizing washing solutions used in Stretford and similar hydrogen sulfide removal processes wherein absorbed hydrogen sulfide is converted to elemental sulfur.

2. Description of the Prior Art

With the increasing concern over atmospheric pollution and the concomitant increasingly strict enforcement of ever more stringent air pollution standards, greater responsibility is being placed on industry to produce pollution-free products in a non-polluting manner. One area of particular concern in the past, and still today, is the discharge or release of sulfur and its compounds, especially hydrogen sulfide ($H_2S$), into the atmosphere as a result of a number of industrial processes. These processes include, for example, petroleum refining, the roasting or smelting of various sulfide containing ores, the sweetening of sour natural gas, destructive distillation of coal and oil shale, gasification or liquefaction of coal, and the production and use of $H_2S$-containing geothermal steam and liquid for generating electricity and for other uses.

Several processes have been developed, and are in relatively common use, for removing $H_2S$ from gas streams such as those generated or encountered in the industrial processes listed above. One such hydrogen sulfide removal process is the Stretford process, which employs an aqueous, alkaline washing solution to preferentially absorb and oxidize $H_2S$ therein. Absorption is done with a water-soluble organic alkaline agent, such as anthraquinone disulphonic acid (ADA), with the hydrogen sulfide being oxidized to particles of elemental sulfur by a pentavalent vanadium compound such as sodium vanadate ($NaVO_3$). Recovery of the sulfur is accomplished by flotation, using a stream of air which is injected into the process solution. This generates a frothy slurry containing the sulfur particles which rises to the top of the solution where it is skimmed off, with the sulfur therein being recovered therefrom by filtration or other liquid/solid separation techniques. In this process, the oxygen in the injected air also serves to reoxidize the reduced vanadate ions and thus regenerate the solution for reuse in the process.

There are a number of similar processes commercially available to perform such sulfur oxidation and recovery. One of these is the Unisulf process, which is described by Fenton et al. in U.S. Pat. No. 4,283,379, the disclosure of which is incorporated herein by reference in its entirety. In this process, the washing solution comprises a solubilized vanadium salt as the oxidizer, a non-quinone aromatic absorption compound, thiocyanate ions, and a water-soluble carboxylate complexing agent. Other processes are based on the use of other metallic oxidizers such as ferric iron and soluble arsenates and stannates.

A commonly used technique to remove the sulfur particles is by circulating the washing solution through a tank-like oxidizer vessel, through which air is bubbled to regenerate said washing solution and form said frothy slurry. With fresh, unused solutions, the elemental sulfur particles which, when formed, have an average diameter in the range between about 0.5 and 5.0 microns, agglomerate to form sulfur clumps of about 10 to about 150 microns in size. Particles of this size are readily buoyed up to the surface in the aforementioned froth and pass through a weir-like opening near the top of the vessel into a sulfur collection vessel. Here, the bubbles in the froth readily collapse, and the resultant liquid suspension or slurry can be easily pumped to a sulfur separation device such as rotary vacuum filter, filter press or centrifuge, from which, after washing to remove the entrained process solution, an extremely pure grade sulfur is obtained. Where a non-particulate form of sulfur is desired, the washed filter cake may be sent to an autoclave or other sulfur melter.

One problem which is sometimes encountered by the operators of many such processes is the introduction of hydrocarbons and/or one or more oxygenated organic contaminants such as alcohols, aldehydes and ketone into the incoming gas stream. Such an introduction may be caused, for example, by the incomplete or improper combustion of the sulfur contaminated waste stream introduced into a Claus process plant supplying the basic feed stock for this process. Another source may be the incomplete condensation and removal of such materials from shale retorting and coal gasification plants. Whatever the source, such materials have been found to cause a number of operating problems. Among these are an acceleration of the rate of formation of non-regenerable contaminants such as thiosulfates in the washing solution and the promotion of long-lasting, highly stable foams in the oxidizer vessel, which causes the formation of "sticky" sulfur particles and makes the subsequent sulfur separation and washing in the filter quite difficult.

When either of these situations occurs, the most usual practice is to treat it symptomatically. For example, when small bubbled foam, which is a very poor vehicle for transporting sulfur particles into the recovery system, and which also causes other operating problems, is present, it is often reduced, or prevented, by adding one or more anti-foaming agents to the solution. Past practices for treating high thiosulfate conditions frequently involve either purging a side stream and adding make up chemicals or, in extreme cases when the thiosulfate level gets too high (i.e., above about 600 g/l of washing solution), changing the entire system solution. However, environmental considerations are making such practices increasingly less attractive. Consequently, a number of processes involving treating the sidestream to destroy the thiosulfate, either by oxidation or reduction, have been developed. However, each of these approaches increases the overall costs of operating the process and adds yet other contaminants to the washing solution.

Instead of just purging a side stream to waste after the fact of excessive thiosulfate buildup, it would be better if there were an inexpensive, easily implemented, non-contaminating method by which hydrocarbon and oxygenated organic compounds at least partially responsible for accelerated thiosulfate buildup and excessive foaming could either be selectively removed from contaminated Stretford type washing solutions, along with some of the excessive thiosulfate, or, preferably, prevented from entering the system altogether. The present invention provides such a method.

SUMMARY OF THE INVENTION

Briefly, in a process in which an incoming H₂S-containing gas stream is contacted with a regenerable aqueous washing solution, said gas stream containing organic contaminants, particularly one or more low molecular weight hydrocarbons and oxygenated compounds such as alcohols, aldehydes and ketones, said washing solution serving both to preferentially absorb hydrogen sulfide from the gas stream and convert it to recoverable particles of elemental sulfur, the present invention provides a method for removing said hydrocarbons and oxygenated compounds from both the incoming gas stream and, where necessary, from washing solutions contaminated with said hydrocarbons and oxygenated compounds.

In a first embodiment, the method of the present invention comprises passing said incoming gas stream through a bed of a charcoal, coal, or other carbon-based adsorbent material useful for adsorbing and removing hydrocarbons and oxygenated compounds therefrom.

In a second embodiment of the invention, desulfurized washing solution contaminated with these materials is passed through this adsorbent, preferably after the sulfur particles have been removed and prior to its being reintroduced into the sulfide/sulfur conversion stage of the process. When used, the adsorbent quickly eliminates the problems caused by the presence of such contaminants in the system. It is also found that said adsorbent will lower the thiosulfate level in said solution, without significantly affecting either the ADA or vanadate levels therein.

BRIEF DESCRIPTION OF THE DRAWINGS

The invention will be readily understood by reference to the drawings, wherein like numerals refer to like elements and in which.

DETAILED DESCRIPTION OF THE INVENTION

Figure 1:
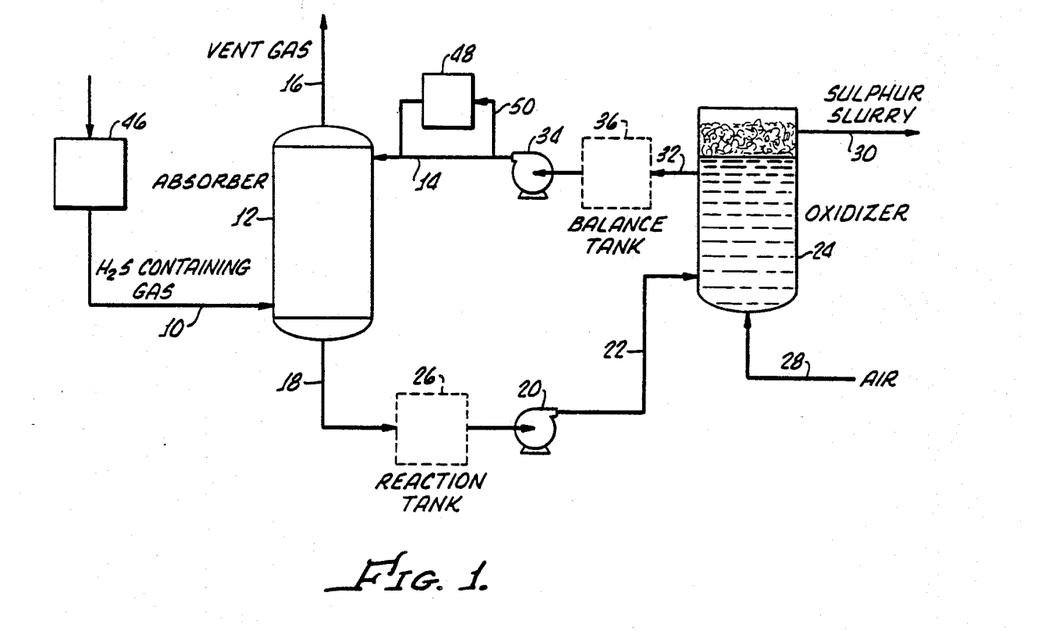
FIG. 1 is a schematic flow diagram illustrating a Stretford type process in which a hydrogen sulfide-containing gas stream is treated, said plant being modified by the method of the present invention.

FIG. 1 is a schematic illustration for a modified Stretford type plant and process for removing and oxidizing H₂S present in a wide variety of gas streams. Such streams may originate from one or more of the operations involved in the refining of petroleum, the sweetening of sour natural gas, the processing of sulfide-bearing ores, the destructive distillation of oil shale and/or coal, the gasification or liquefaction of coal, the use of geothermal fluids to generate electricity and many other industrial processes. Most of the processes conforming to the general scheme of FIG. 1 can successfully treat gas streams containing from less than one mole percent to as much as 80 mole percent H₂S. One such gas stream is that produced by the hydrogenation and hydrolysis of a Claus process tail gas, as disclosed by Beavon in U.S. Pat. No. 3,752,877. When the Claus process system is properly balanced, such a tail gas will typically contain from about 0.5 to about 5.0 mole percent hydrogen sulfide, from about 2 to about 15 mole percent carbon dioxide, from about 5 to about 30 mole percent water, and traces of methane, carbonyl sulfide and methyl mercaptan, with the remainder being nitrogen and essentially free of hydrocarbons.

In the process of FIG. 1, the hydrogen sulfide-containing gas is introduced, through conduit 10, into the bottom of absorber 12, said gas flowing upwardly therethrough in countercurrent contact with a washing solution introduced, through conduit 14 into the top of absorber 12. In so doing, substantially all of the H₂S is absorbed from the gas by the downwardly flowing washing solution, thereby forming an essentially H₂S-free vent gas which is discharged through conduit 16. While an absorber employing countercurrent flow has been described, it is understood that other known gas/liquid contacting equipment, such as a venturi scrubber may also be employed for this purpose. Other suitable equipment includes single and multistage contacting tanks using countercurrent and/or concurrent flow of the gas stream and washing solution.

Once absorbed by the washing solution, the H₂S is oxidatively converted t elemental sulfur by reaction with the constituents of the washing solution. The reduced washing solution and entrained elemental sulfur are withdrawn from absorber 12 via conduit 18 and pumped by pump 20 through conduit 22 into the bottom of oxidizer 24. Prior to the introduction of the reduced solution into oxidizer 24, sufficient time should be allowed for the complete conversion of the absorbed H₂S into elemental sulfur. While the exact amount of time required for this to happen is a function of the particular chemistry of the washing solution used and the overall efficiency of the sulfide oxidation process, a typical time period for such conversion is about 5 minutes which can be provided by suitably adjusting the total residence time of the washing solution within absorber 12. Optionally, where longer residence times are required, reaction tank 26 may be provided to hold the solution for enough time to allow the complete sulfide/sulfur conversion to occur. Normally, it is during this time that the small (about 0.5 to about 5.0 micron) sulfur particles agglomerate into the larger (about 10 to about 150 micron) particles which are found to be optimum for subsequent recovery operations. In a typical operating plant, the sulfur concentration entering the oxidizer is between about 1 and about 5 weight percent.

The contents of oxidizer 24, i.e., reduced solution and elemental sulfur particles, are contacted with air, or other molecular oxygen-containing gas, at a temperature of between about 80° and about 140° F., which is introduced through conduit 28 into the bottom of oxidizer 24. The entering air is preferably in the form of small bubbles which may be formed by introducing said gas through a sparger (not shown) preferably accompanied by a vigorous churning of the solution with a high-shear rotating stirrer adapted for this purpose (also not shown). This quickly promotes intimate contact between oxygen in the air bubbles and the reduced vanadium in the washing solution so that it is swiftly oxidized and the solution regenerated. These small air bubbles also attach themselves to the entering sulfur particles, thereby causing them to float to the top of oxidizer 24, where a frothy slurry is formed. This is drawn off, via conduit 30, for recovery. The now desulfurized, regenerated washing solution is removed from oxidizer 24 via conduit 32, and recycled by pump 34 back into absorber 12 via conduit 14. Optionally, balance tank 36 is provided as an accumulator surge tank for the thus regenerated washing solution. Make-up chemicals, when required, can also be added at this point.

Figure 2:
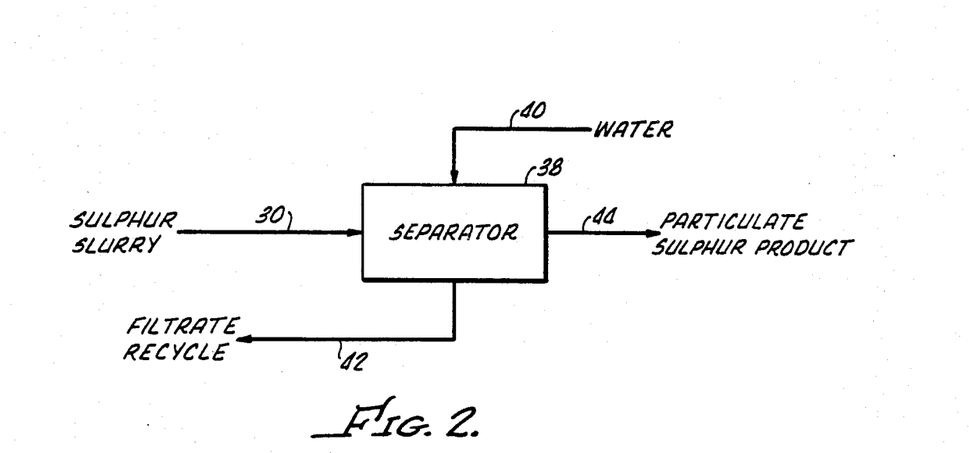
FIG. 2 illustrates a method for separating the product sulfur from a sulfur slurry produced in the process illustrated in FIG. 1.

The frothy sulfur slurry, which typically contains from about 15 to about 20 weight percent elemental sulfur, is withdrawn from oxidizer 24 via conduit 30 for separation and recovery. FIG. 2 illustrates a typical recovery scheme. Here, the slurry is fed, via conduit 30, into liquid/solid separator 38, which can be a vacuum filter, centrifuge, or other device capable separating sulfur particles from an aqueous slurry. The separated sulfur is washed with water introduced via conduit 40, with the filtrate, comprised of eluted washing solution and wash water, being withdrawn via conduit 42 for recycle back into absorber 12. The now washed, purified sulfur product is withdrawn from separator 38 via conduit 44 as a relatively dried cake comprised of finely divided particles. The particulate sulfur produced by this process typically achieves a purity on the order of 99+ percent, often as high as 99.9+ percent. A particulate product of such character is suitable for all uses, including agricultural uses, without further purification. Where desired, the cake can be fed into a melter (not shown), which produces molten sulfur and separates by gravity and/or evaporation any washwater carried therein.

In the overall process as described above, it is necessary that the incoming feed gas be free of low molecular weight oxygenated compounds such as alcohols, aldehydes and ketones, and/or low molecular weight hydrocarbons, if the aforesaid problems are to be avoided. As defined herein, the term "low molecular weight" refers to compounds having up to about 8 carbon atoms. Such materials can originate from a variety of sources, depending upon the nature of the gas stream being treated. One such stream is from a Claus process system wherein the overall operating temperature is either too low to cause complete combustion or there is an improper balance between the combusted and reactant gas streams used in such a process. Another is from the retorting operations in a shale oil producing plant or coal gasification facilities where low boiling constituents in the $H_2S$ contaminated off-gases are not completely condensed out. As described herein above, if these various gas-borne contaminants are not removed prior to the entry of the stream into absorber 12, severe problems can occur throughout the system. If they cannot be removed, the operating time available until it becomes necessary to discard and replace the washing solution will be considerably shortened. In a typical Stretford facility having perhaps 300,000 gallons of solution, such discarding and replacement would cost on the order of over half a million dollars.

In the present invention, it has been found that this problem can be avoided by contacting at least a portion of either the incoming contaminated gas stream or an already contaminated washing solution with a charcoal or other carbonaceous adsorbent useful for removing said contamination. As defined herein, "carbonaceous adsorbents" are substances consisting essentially of carbon and capable of removing low molecular weight hydrocarbons and/or low molecular weight oxygenated compounds selected from the group consisting of alcohols, aldehydes, ketones, and mixtures thereof. As defined herein, "charcoal" is any adsorbent substance consisting essentially of carbon which is produced by the pyrolysis or "charring" of a carbonaceous material such as bituminous coal, coke, peat, lignite, coconut and other nut shells, corncobs, wood, coffee beans, etc.

Most usually, these materials are "activated" before being placed in use. See, for example, chapters 7, 8 and 9 in "Activated Carbons" (John W. Hassler, Chemical Publishing Company, New York, N.Y., 1963) which are incorporated by reference herein. The literature shows that a wide range of pyrolysis conditions and activation procedures may be used. Typical measures for screening different types and grades of charcoal are the particle size, the pore diameter (in angstrom units), the active surface area (in square meters/gram of charcoal), the large molecule adsorption capacity (molasses-relative efficiency, M-RE) and the overall measure of relative utility (iodine-relative efficiency, I-RE).

Prior art references reporting certain experimental results concerning the removal of one material or contaminant from a given process solution with one type of charcoal are not necessarily a reliable guide to estimating the potential effectiveness of a different charcoal in the same solution. This is especially true with a multi-component process solution which comprises a complex mixture of organic and inorganic compounds such as is found in a Stretford-type process. However, procedures for testing various grades and types of charcoal for suitability in the present invention are basically simple and involve merely contacting a sample of solution or gas with a sample of charcoal or other carbon adsorbent and determining whether any of the low molecular weight hydrocarbons and oxygenated compounds are removed, and if so which ones, and to what degree.

In the present situation, it is desired to remove one or more low molecular weight hydrocarbons and/or alcohols, aldehydes and ketones, either from the incoming $H_2S$-containing gas or from an already contaminated solution, without negatively affecting the basic sulfur removing process. Such removal is preferably accomplished with an activated charcoal material derived from bituminous coal, said material preferably having an average particle size diameter between about 0.010 and about 0.075 inches, a pore diameter of between about 10 and about 1000 angstrom units, a surface area between about 950 and about 1050 square meters/gram of carbon, an I-RE of at least 900, and a density between about 25 and about 28 lb/ft$^3$. One activated charcoal material found to meet these criteria is sold under the tradename Filtersorb by the Calgon Corporation.

In the process of the present invention, at least a portion and, preferably, all of the incoming gas in conduit 10 will, before entering absorber 12, pass down through a bed of charcoal held in container 46 (to minimize movement of the charcoal particles), said container typically being shaped so that the charcoal forms a bed therein which ranges between about 1 and about 3 feet in depth. With the mesh size specified above, such a thickness is found to effectively remove any hydrocarbon and/or oxygenated organic compounds which may be present in the feedstock, with only a relatively small pressure drop, at a space velocity of about 30 to about 100, preferably about 40 to about 60 actual ft$^3$/min/ft$^3$ of charcoal. At this rate, with the contamination levels experienced with a reasonably well-adjusted Claus plant, such a bed should be sufficient for about 6 months of continuous use. The actual amount of charcoal placed into container 46 will, of course, depend on the organic contaminant concentration, and volume of gas being processed. To maximize the effectiveness of contaminant removal, it is important that the temperature of the bed be kept relatively low, i.e., under about 40° C. Since, in many Stretford-type plants, the incoming gas is either passed through an external condenser to recover higher boiling hydrocarbons therefrom or washed to remove any SO₂ present, excessive gas temperatures are not a major concern in most cases.

After a time the bed must be regenerated. The normal practice for so doing is to desorb the bed with dry nitrogen or steam at a temperature of between about 110° to about 130° C. to strip out the organic contaminants, with the combined gases usually being combusted to convert the organic contaminants to carbon dioxide. To prevent downtime in the process, it is preferred that there be two charcoal beds in parallel, so that one will be available for use when the other is being desorbed and regenerated.

In the second and alternatively preferred embodiment of the present invention, charcoal container 48 is placed in parallel side stream conduit 50 such that at least some, preferably between about 5 and about 25 percent, of the desulfurized circulating washing solution returning to absorber 12 will pass therethrough. When this is done, it is found that, with a preferred charcoal adsorbent having the characteristics defined above, at least 25%, preferably at least 50%, more preferably at least 75%, and most preferably 100% of the organic contaminants of interest are effectively removed from the treated stream, with relatively little, i.e., less than about 35, preferably less than about 20 percent by weight of the ADA in the solution being extracted. Consequently, in a continuously operating system, the overall loss of process chemicals as a result of such treatment is found to be low.

It is also found that, in addition to removing organic contaminants known to accelerate the rate of thiosulfate generation, the preferred bituminous coal-based charcoal of the characteristics defined above will adsorb some of the thiosulfate already in the solution, often to the point where the concentration of thiosulfate in the solution is significantly reduced. Such a result is unexpected since charcoal is normally not a good agent for removing highly dissociated inorganic compounds such as sodium thiosulfate. For solution treatment, the amount of charcoal used should be between about 20 and about 70 and, preferably between about 30 and about 50 cubic feet/1000 gal/min of solution being treated. In addition to treating a separated sidestream of washing solution, there may be circumstances, as shown in Example 3 below, wherein it is desirable, or necessary, to insert container 48 directly into conduit 14 so that the entire stream of circulating solution passes therethrough. Other than adjusting the size of container 48 to contain the appropriate amount of charcoal adsorbent, no other changes are required in the process or equipment used.

As in the first embodiment of this invention, it is preferred that two parallel charcoal beds be used. However, in this case, the preferred desorbent is hot water at a temperature of between about 30° C. to about 95° C., with the stripped thiosulfate-containing solution being disposed of by conventional methods. The need for regeneration will depend on the nature of the particular situation involved. Where the process involves treating tail gases from a reasonably well-adjusted Claus plant so that both the rate and level of contamination are fairly low, a relatively long time will elapse before regeneration is required. Where the plant is directly treating uncondensed off-gases from a shale oil or coal gasification process plant, both the rate and level of contamination will tend to be much higher, so that shorter operating times before regeneration is required should be expected.

As noted above, one advantage of using the preferred charcoal adsorbent, said charcoal having the characteristics defined above, is that relatively little of the ADA from the solution will be removed. This is unexpected in view of literature references wherein charcoal adsorbents are used to completely remove ADA. This is also unexpected since, in general, aromatic compounds are more readily adsorbed by charcoal than are aliphatic molecules of similar molecular size. Without wishing to bound thereby, it is postulated that this difference is caused by the relative large size and complexity of ADA salt molecule as compared to the relatively less complex smaller molecular structures of the organic contaminants isolated from the stream. As a result of this difference, it takes much less of the ADA to "saturate" a charcoal having the characteristics defined above than it does for the contaminant molecules present.

The method of the present invention may be applied to a number of presently used H₂S absorption-oxidation process conforming to the general description given above. These processes are known commercially by such names as Stretford (U.S. Pat. No. 3,097,926), wherein said washing solution comprises sodium carbonate, 9, 10-disodium anthraquinone disulfonate and sodium vanadate, Unisulf (U.S. Pat. No. 4,283,379) wherein said washing solution comprises sodium vanadate, one or more watersoluble non-quinone or quinone aromatic compounds, sodium thiocyanate and citric acid as a complexing agent, Takahax (U.S. Pat. No. 3,459,495) wherein said washing solution comprises a water-soluble naphthaquinone sulfonate alone or with a chelate of ferric iron, Lo-Cat (U.S. Pat. No. 4,374,104) wherein said washing solution comprises ferric iron chelated with one or more polyamino polycarboxylic acids and one or more polyhydroxy sugars, Sulfolin (U.S. Pat. No. 4,355,011) wherein said washing solution comprises sodium thiocyanate, sodium carbonate, one or more organic nitrogen compounds such as amides, and sodium vanadate, and SulFerox (U.S. Pat. No. 4,741,888) wherein said washing solution comprises an iron chelate such as ammonium ferric N-(2-hydroxyethyl) ethylene diamine triacetate chelate, the disclosures of said patents being incorporated herein by reference in their entireties. While all of them vary in regard to the particular reactants and chemistry involved in H₂S-to-sulfur conversion, the absorption and oxidation steps are all sufficiently similar that the method of the present invention can be used to advantage.

The present invention is further illustrated by the following examples which are illustrative of various aspects of the invention and not intended as limiting the scope of the invention, as defined in the claims.

EXAMPLE 1

Approximately 150 gallons of Unisulf solution taken from an operating system experiencing an unexpected increase in the rate of thiosulfate generation (about 1.5 g/l/day) was. used as the operating solution of a pilot plant system. The gas feed stock was pure hydrogen sulfide diluted to a concentration of about 5%, by volume, with a mixture of carbon dioxide and dry nitrogen. The plant was operated under the following conditions:

| Temperature | in Absorption tank | 90° F. |
| --- | --- | --- |
| | in Oxidizer tank | 90° F. |
| | in Balance tank | 90° F. |
| Gas feed rate | | 100 scfm |
| Air to Oxidizer (5-8 psig) | | 735 scfm |
| Balance tank residence time | | 10 min |
| Absorption tank residence time | | 12 min |
| Initial vanadium (as NaVO$_3$) | | 3.29 g/l |
| Initial ADA | | 1.52 g/l |
| Initial thiosulfate (as Na$_2$S$_2$O$_3$.5 H$_2$O) | | 38.3 g/l |

After about 900 hours (37.5 days) of continuous operation, the nominal vanadium and ADA concentrations remained essentially unchanged, but the final thiosulfate concentration was about 79 g/l, for an average daily increase in thiosulfate concentration of about 1.1 g/l.

EXAMPLE 2

A small steel filter apparatus holding about 600 cc of granulated Filtersorb 300 charcoal was inserted into the pilot plant solution return line (corresponding to conduit 14 in FIG. 1) and, with the hydrogen sulfide input gas stream shut off, the final solution from Example 1 was passed therethrough for about 10 days at a rate of approximately 600 cc per minute. This is equivalent to about a 14 fold turnover of plant solution inventory. The charcoal was initially changed every 2 hours, with the timespans increasing to about every 4 hours after 1 day of operation and every 12 hours after about 3 days of operation. At the conclusion of the filter time the ADA concentration was reduced by about 34%. However, it was also found that the thiosulfate concentration had dropped about 28 percent to about 57 g/l. The filter bed was then removed, and the spent charcoal was steam treated to desorb the contaminants extracted from the solution. Analysis of the organic contamination in the condensate showed that most of it was a mixture of alcohols and ketones, both aromatic and aliphatic. Particular contamiants observed were acetophenone and acetonylacetone, both having the ability to oxidize the sulfide in the solution to thiosulfate and to cause excessive foaming. Similar contaminants were extracted from reserve samples of the Unisulf solution used in Example 1. None of these materials was found in fresh charcoal.

After charcoal filtration was completed, the ADA concentration was brought up to normal, the sulfur input stream reopened and pilot plant operation was resumed for an additional 17 days, using operating conditions similar to those described in Example 1 above. At the end of this time, the thiosulfate level had increased to about 60 g/l for an average daily increase of about 0.18 g/l. This is about the rate observed with fresh solutions in a properly operating commercial Unisulf unit, thus proving that the solution had been restored to its original condition insofar as thiosulfate generation was concerned.

EXAMPLE 3

The Unisulf solution used to remove H$_2$S from uncondensed off-gases coming from a shale oil retorting facility was found to be contaminated with some amount of low molecular weight hydrocarbons which had apparently come in with the feed gas and was causing the generation of a large amount of stable foam. During a scheduled shutdown, the entire lot of process solution was passed through a bed of Filtersorb 300 for a time sufficient to remove the contamination. During this treatment, it was observed that, while the charcoal was saturated with the Unisulf chemicals, the overall loss of these chemicals was small and, further, the charcoal was still able to effectively remove the contaminant hydrocarbons.

When the plant was restarted it was observed that the thus decontaminated solution had little foaming tendency, that high solution circulation rates were possible and that the overall plant operation was more stable than before the process solution was treated.

This invention may be embodied in other forms without departing from the spirit or essential characteristics thereof. Consequently, the present embodiments and examples are only to be considered as being illustrative and not restrictive, with the scope of the invention being indicated by the appended claims. All embodiments which come within the scope and equivalency of the claims are, therefore, intended to be embraced therein.

We claim:

1. A hydogen sulfide removal process wherein an organically contaminated hydrogen sulfide-containing gas stream is contacted with a circulating, regenerable aqueous washing solution in which said washing solution first absorbs said hydrogen sulfide and then oxidizes it into sulfur particles, with said sulfur particles being removed and recovered, the process further comprising contacting at least a portion of said gas stream with charcoal to reduce the concentration of said organic contamination in said gas stream.

2. The process of claim 1 wherein said charcoal is an activated carbon derived from bituminous coal, has a particle size diameter between about 0.010 and about 0.075 inches and a density between about 25 and about 28 pounds per cubic foot.

3. The process of claim 2 wherein said activated carbon has a pore size between about 10 and about 1000 angstroms in diameter, a surface area between about 950 and about 1050 meters$^2$/gram of carbon and an I-RE of at least about 900.

4. The process of claim 3 wherein all of said gas stream is contacted with said charcoal and said gas has a temperature below about 40° C.

5. The process of claim 1 wherein the space velocity of said contaminated gas stream is between about 30 and about 100 ft$^3$/minute/ft$^3$ of charcoal.

6. The process of claim 1 wherein said space velocity of said contaminated gas stream is between about 40 and about 60 ft$^3$/minute/ft$^3$ of charcoal.

7. A hydrogen sulfide removal process wherein an organically contaminated hydrogen sulfide-containing gas stream is contacted with a circulating, regenerable aqueous washing solution in which said washing solution first absorbs said hydrogen sulfide and then oxidizes it into sulfur particles, said process further generating thiosulfate, with said sulfur particles being removed and recovered, the process further comprising the steps of:

removing at least a portion of said circulating washing solution after said sulfur has been removed;

contacting said portion with charcoal to remove said organic contamination and at least a portion of said thiosulfate; and returning and reusing said portion in said process.

8. The process of claim 7 wherein said separated portion is between about 5 and about 25 percent of said circulating solution.

9. The process of claim 7 wherein the amount of charcoal used is between about 20 and about 70 pounds per 1000 gallons per minute of solution treated.

10. The process of claim 7 wherein the amount of charcoal used is between about 40 and about 60 pounds per 1000 gallons per minute of solution treated.

11. The process of claim 7 wherein said charcoal is an activated carbon derived from bituminous coal, has a particle size diameter between about 0.010 and about 0.075 inches and a density between about 25 and about 28 pounds per cubic foot.

12. The process of claim 11 wherein said activated carbon has a pore size between about 10 and about 1000 angstroms in diameter, a surface area between about 950 and about 1050 meters$^2$/gram of carbon and an I-RE of at least about 900.

13. The process of claim 7 wherein at least 25% of said contamination is removed from said circulating solution.

14. The process of claim 7 wherein at least 50% of said contamination is removed from said circulating solution.

15. The process of claim 7 wherein all of said contamination is removed from said circulating solution.

16. A hydrogen sulfide removal process wherein an organically contaminated hydrogen sulfide-containing gas stream is contacted with a circulating, regenerable aqueous washing solution in which said washing solution first absorbs said hydrogen sulfide and then oxidizes it into sulfur particles, with said sulfur particles being removed and recovered, with said process also generating thiosulfate, the process further comprising the steps of:
   separating and removing at least a portion of said washing solution from circulation after said sulfur particles have been removed;
   contacting said portion with charcoal;
   removing said organic contamination and at least a portion of said thiosulfate therefrom; and returning and reusing said portion in said process.

17. The process of claim 16 wherein said charcoal is an activated carbon derived from bituminous coal, has a particle size diameter between about 0.026 and about 0.030 inches and a density between about 25 and about 28 pounds per cubic foot.

18. The process of claim 17 wherein said activated carbon has a pore size between about 10 and about 1000 angstroms in diameter, a surface area between about 950 and about 1050 meters$^2$/gram of carbon and an I-RE of at least about 900.

19. The process of claim 16 wherein said portion is between about 5 and at about 25 percent of said circulating solution.

20. The process of claim 16 wherein said the amount of charcoal used is between about 20 and about 70 pounds of charcoal per 1000 gallons per minute of solution treated.

21. The process of claim 16 wherein said the amount of charcoal used is between about 40 and about 60 pounds of charcoal per 1000 gallons per minute of solution treated.

22. A hydrogen sulfide removal process wherein an organically contaminated hydrogen sulfide-containing gas stream is contacted with a circulating, regenerable aqueous washing solution in which said washing solution first absorbs said hydrogen sulfide and then oxidizes it into sulfur particles, with said sulfur particles being removed and recovered, said process further forming thiosulfate, the process comprising the steps of:
   contacting at least a portion of said gas stream with a first bed of charcoal prior to contacting said gas with said washing solution;
   separating and removing at least a portion of said washing solution from circulation after said sulfur particles have been removed;
   contacting said portion of washing solution with a second bed of activated charcoal;
   removing at least 25% of said, organic contamination and at least a portion of said thiosulfate therefrom; and
   returning and reusing said portion of washing solution in said process.

23. The process of claim 22 wherein at least 50% of said contamination is removed from said circulating solution.

24. The process of claim 22 wherein all of said contamination is removed from said circulating solution.

25. The process of claim 22 wherein said charcoal is an activated carbon derived from bituminous coal, has a particle size diameter between about 0.026 and about 0.030 inches and a density between about 25 and about 28 pounds per cubic foot.

26. The process of claim 25 wherein said activated carbon has a pore size between about 10 and about 1000 angstroms in diameter, a surface area between about 950 and about 1050 meters$^2$/gram of carbon and an I-RE of at least about 900.

27. The process of claim 22 wherein all of said gas stream is contacted with said charcoal and said gas has a temperature below about 40° C.

28. The process of claim 22 wherein the space velocity of said contaminated gas stream is between about 30 and about 100 ft$^3$/minute/ft$^3$ of charcoal.

29. The process of claim 22 wherein the space velocity of said contaminated gas stream is between about 40 and about 60 ft$^3$/minute/ft$^3$ of charcoal.

30. The process of claim 22 wherein said portion of circulating washing solution is between about 5 and at about 25 percent thereof.

31. The process of claim 22 wherein said second charcoal bed contains between about 20 and about 70 pounds of charcoal per 100 gallons/minute of solution treated.

32. The process of claim 22 wherein said second charcoal bed contains between about 40 and about 60 pounds of charcoal per 1000 gallons per minute of solution treated.

33. A hydrogen sulfide removal process wherein a hydrogen sulfide-containing gas stream, contaminated with one or more contaminants selected from the group consisting of low molecular weight alcohols, aldehydes, and ketones, low molecular weight hydrocarbons, and mixtures thereof, is contacted with a circulating, regenerable aqueous washing solution in which said washing solution first absorbs said hydrogen sulfide and then oxidizes it into sulfur particles, with said sulfur particles being removed and recovered, the process further comprising contacting at least a portion of said gas stream with charcoal and removing said contaminants from said gas stream.

34. The process of claim 33 wherein said charcoal is an activated carbon derived from bituminous coal, has a particle size diameter between about 0.026 and about 0.030 inches and a density between about 25 and about 28 pounds per cubic foot.

35. The process of claim 34 wherein said activated carbon has a pore size between about 10 and about 1000 angstroms in diameter, a surface area between about 950 and about 1050 meters²/gram of carbon and an I-RE of at least about 900.

36. The process of claim 33 wherein all of said gas stream is contacted with said charcoal and said gas has a temperature below about 40° C.

37. A hydrogen sulfide removal process wherein a hydrogen sulfide-containing gas stream, contaminated with one or more compounds selected from the group consisting of low molecular weight alcohols, aldehydes and ketones, low molecular weight hydrocarbons, and mixtures thereof is contacted with a circulating, regenerable aqueous washing solution in which said washing solution first absorbs said hydrogen sulfide and then oxidizes it into sulfur particles, with said sulfur particles being removed and recovered, the process further generating thiosulfate in said circulating solution, the steps of:
  separating and removing at least a portion of said washing solution from circulation after said sulfur has been removed; and
  contacting said portion with charcoal and removing at least 25% of said organic contamination and at least a portion of said thiosulfate therefrom.

38. The process of claim 37 wherein said separated portion is between about 5 and at about 25 percent of said circulating solution.

39. The process of claim 37 wherein at least 50% of said contamination is removed from said circulating solution.

40. The process of claim 37 wherein all of said contamination is removed from said circulating solution.

41. The process of claim 37 wherein the amount of charcoal used is between about 20 and about 70 pounds of charcoal per 1000 gallons/minute of solution treated.

42. The process of claim 37 wherein said charcoal is an activated carbon derived from bituminous coal, has a particle size diameter between about 0.026 and about 0.030 inches and a density between about 25 and about 28 pounds per cubic foot.

43. The process of claim 42 wherein said activated carbon has a pore size between about 10 and about 1000 angstroms in diameter, a surface area between about 950 and about 1050 meters²/gram of carbon and an I-RE of at least about 900.

44. A hydrogen sulfide removal process wherein a hydrogen sulfide-containing gas stream, contaminated with one or more compounds selected from the group consisting of low molecular weight alcohols, aldehydes and ketones, low molecular weight hydrocarbons, and mixtures thereof, is contacted with a circulating, regenerable aqueous washing solution in which said washing solution first absorbs said hydrogen sulfide and then oxidizes it into sulfur particles, with said sulfur particles being removed and recovered, said process further forming thiosulfate, the process further comprising the steps of:
  contacting at least a portion of said gas stream with a first bed of charcoal prior to contacting said gas with said washing solution;
  separating and removing at least a portion of said washing solution from circulation after said sulfur particles have been removed;
  contacting said portion of washing solution with a second bed of activated charcoal and removing at least 25% of said organic contamination and at least a portion of said thiosulfate therefrom; and
  returning and reusing said portion of washing solution in said process.

45. The process of claim 44 wherein at least 50% of said contamination is removed from said circulating solution.

46. The process of claim 44 wherein all of said contamination is removed from said circulating solution.

47. The process of claim 1 wherein said washing solution comprises sodium carbonate, 9, 10-disodium anthraquinone disulfonate and sodium vanadate.

48. The process of claim 1 wherein said washing solution comprises sodium vanadate, one or more watersoluble nonquinone aromatic compounds, sodium thiocyanate and citric acid as a complexing agent.

49. The process of claim 1 wherein said washing solution comprises a water-soluble naphthaquinone sulfonate alone or with a chelate of ferric iron.

50. The process of claim 1 wherein said washing solution comprises ferric iron chelated with one or more polyamino polycarboxylic acid and one or more polyhydroxy sugars.

51. The process of claim 1 wherein said washing solution comprises sodium thiocyanate, sodium carbonate, one or more organic nitrogen compounds and sodium vanadate.

52. The process of claim 1 wherein said washing solution comprises ammonium ferric N-(2-hydroxyethyl) ethylene diamine triacetate chelate.

53. The hydrogen sulfide removal process of claim 44 wherein said hydrogen sulfide-containing gas stream is contaminated with one or more low molecular weight hydrocarbons.

54. The hydrogen sulfide removal process of claim 44 wherein said hydrogen sulfide-containing gas stream is contaminated with one or more compounds selected from the group consisting of low molecular weight alcohols, aldehydes, ketones, or mixtures thereof.

55. The process of claim 54 wherein said contamination comprises one or more alcohols.

56. The process of claim 54 wherein said contamination comprises one or more aldehydes.

57. The process of claim 54 wherein said contamination comprises one or more ketones.

58. A hydrogen sulfide removal process wherein an organically contaminated hydrogen sulfide-containing gas stream is contacted with a circulating, regenerable aqueous washing solution in which said washing solution first absorbs said hydrogen sulfide and then oxidizes it into sulfur particles, with said sulfur particles being removed and recovered, the process further comprising contacting at least a portion of said gas stream with an adsorbent consisting essentially of carbon to reduce the concentration of said organic contamination in said gas stream.

59. The process of claim 53 wherein said carbon adsorbent is activated prior to use in said process.

60. The process of claim 58 wherein all of said gas stream is contacted with said adsorbent and said gas has a temperature below about 40° C.

61. The process of claim 58 wherein said process further comprises contacting at least a portion of said washing solution with said adsorbent.

62. The process of claim 61 wherein said portion is between about 5 and about 25 percent of said washing solution.

63. The process of claim 58 wherein at least 25 percent of said contaminants is removed.

64. The process of claim 58 wherein at least 75 percent of said organic contamination is removed.

65. The process of claim 60 wherein all of said organic contamination is removed.

66. The process of claim 58 wherein the space velocity of said contaminated gas stream is between about 30 and about 100 ft.$^3$/minute/ft.$^3$ of said adsorbent.

67. The process of claim 61 wherein the portion of washing solution is contacted with between about 20 and about 70 pounds of adsorbent per 1,000 gallon/minute of solution treated.

* * * * *

UNITED STATES PATENT AND TRADEMARK OFFICE
CERTIFICATE OF CORRECTION

PATENT NO. : 4,892,723
DATED : January 9, 1990
INVENTOR(S) : Dennis D. Delaney and Hugh W. Gowdy It is certified that error appears in the above-identified patent and that said Letters Patent is hereby corrected as shown below:

Claim 31, column 12, line 45, change "100" to --1000--.

Claim 48, column 14, line 16, change "watersoluble" to --water-soluble--.

Signed and Sealed this

Twenty-eighth Day of July, 1992

Attest:

DOUGLAS B. COMER

Attesting Officer     Acting Commissioner of Patents and Trademarks